Figure 1:
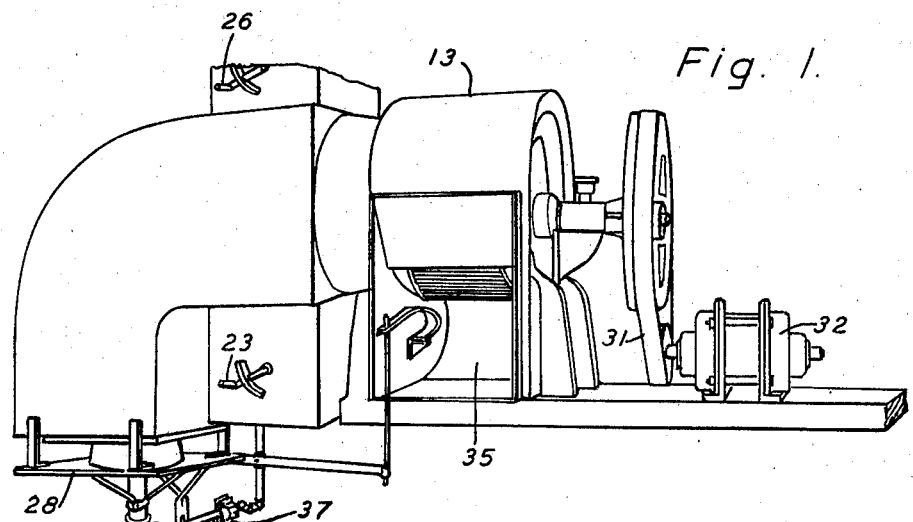

Jan. 5, 1937.  C. L. GEHNRICH  2,066,524
UNIT HEATER FOR HOT GASES
Filed March 23, 1935

INVENTOR
CHARLES L. GEHNRICH

BY *Hauff & Warland*
ATTORNEYS.

Patented Jan. 5, 1937

2,066,524

UNITED STATES PATENT OFFICE 2,066,524

UNIT HEATER FOR HOT GASES

Charles L. Gehnrich, Elmhurst, N. Y.

Application March 23, 1935, Serial No. 12,590

2 Claims. (Cl. 126—110)

This invention relates to unit heaters and more particularly to heaters which derive their heat from the combustion of fluid fuels and are used as a source of hot gases for processing operations and for general heating and drying purposes.

Great difficulties have been encountered in drying, heating and processing operations in general, in which a gaseous fluid is employed as the heat carrying medium, because of the bulkiness of the equipment resulting from the employment of thick refractory materials therein, high cost of its operation, high replacement of parts and low measure of flexible adjustability to meet varying conditions of the processing operations.

An important novel feature of my invention is the absence of any refractory material in the combustion chamber, which greatly reduces the bulk of the unit for any given capacity. This also cuts down replacement of parts and is a decided advantage in the servicing of the unit and consequently in the cost of its operation.

Another feature is its ease of adjustment to meet varying conditions of the processing operations or from one processing operation to another and its adaptability to automatic control.

Still another feature of the invention is the simplicity of its construction and the improbability of unintentional extinguishing of the flame of the burning fuel during operation of the unit.

Broadly, my invention comprises a burner, burning gaseous, liquid or solid dispersed in liquid fuel, with its flame directed centrally through the larger base of and into a hollow, open-ended truncated conical or pyramidal combustion chamber inserted into the open, outer end of, and in spaced relation with, a duct of suitable cross section, which duct is surrounded by and in spaced relation with an outer casing of suitable cross section, open at the burner end of the unit, said duct and casing jointly communicating with the intake of a suitable fan or blower, the larger base of the combustion chamber being in registry with a baffle plate placed substantially in a plane transverse to the axis of the combustion chamber and spaced from the outer openings of the duct and casing, the stream of fresh cool air or other gas drawn through the duct past the exterior surface of the heated walls of the combustion chamber, taking up heat therefrom, serving to prevent oxidation and deterioration of the walls of the combustion chamber, the stream of cool air or gas being drawn through the annular space between the duct and the casing, taking up heat from the exterior surface of the duct, serving, by its insulating effect, to prevent heat loss therefrom, the air in the duct, heated through the walls of the combustion chamber, intermixing with the hot gases of combustion leaving the narrow base thereof, the mixed hot gases continuing to the inner end of the duct whereat they are joined, if desired, by hot gases recirculated from the processing operation, the latter mixture then commingling at the intake of the blower with the hot gases carried through the casing.

Figure 2:
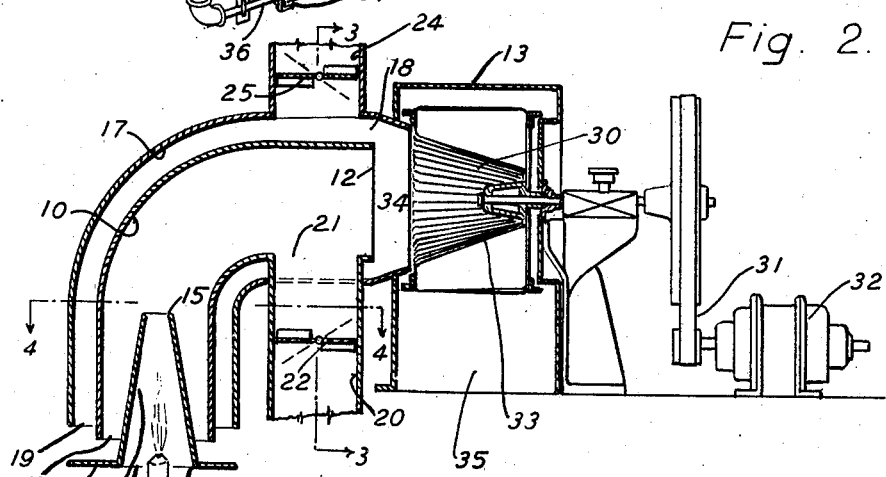
Figure 3:
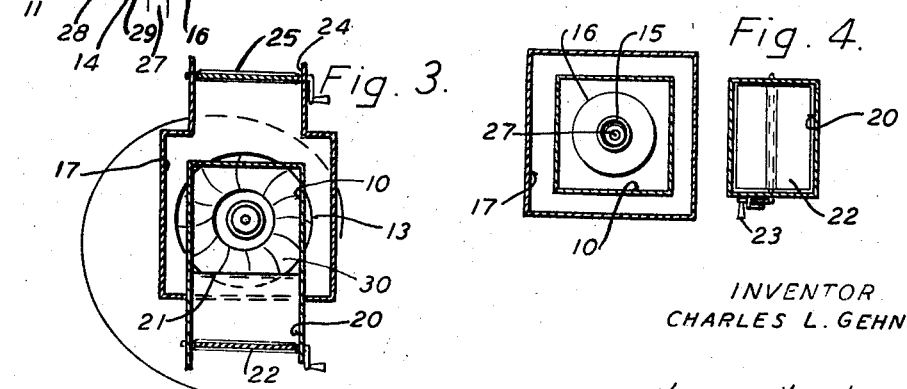
Figure 4:
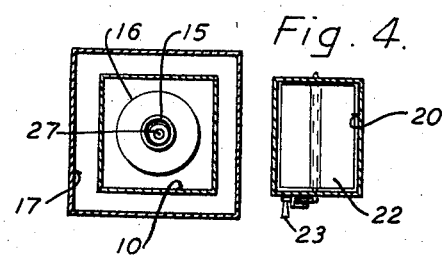

Various other features and advantages of the invention will be apparent from the following particular description and reference to the accompanying drawing in which there is shown for the purpose of illustration one form of a unit embodying the invention and in which, Fig. 1 is a perspective view of a complete assembly of one form of the invention, Fig. 2 is a vertical longitudinal sectional view through the middle of the apparatus, and Fig. 3 is a transverse section along the line 3—3 of Fig. 2 and shows the relationship of the recirculation and excess air ducts to the duct and the casing, and Fig. 4 is a transverse section along the line 4—4 of Fig. 2 and shows in general the spaced relationship between the burner, the combustion chamber, the hot air duct and casing, and the recirculation duct.

In the following description of the illustrated embodiment of the invention, various parts and details will be identified by specific means for convenience, but they are intended to be as generic in their application as the art will permit. Like reference characters denote like parts in the several figures of the drawing.

The hot air duct 10, constructed of any desirable transverse and longitudinal cross section, for example as in the drawing, square transversely and L shaped longitudinally, is open at its end 11 to the atmosphere and at its inner end 12 to the intake of the blower 13. The combustion chamber 14 is inserted with its narrow end 15 projecting for some distance into the outer end 11 of the hot air duct 10 in spaced relation thereto and preferably co-axially therewith and its broader end 16 projecting for preferably a suitably shorter distance outwardly and downwardly beyond the end 11 of the hot air duct.

The casing 17, constructed of relatively similar cross section to the hot air duct 10, surrounds the latter in spaced relation thereto with the inner end 18 thereof communicating with the intake of the blower 13 and the other end 19 opening to the atmosphere at a point preferably slightly above that of the open end 11 of the hot air duct 10.

A recirculation air duct 20 of suitable cross section, for example rectangular, passes through the casing 17 preferably at a point near the blower 13 and opens into and communicates with the hot air duct 10 at the opening 21. The amount of air to be recirculated through the duct 19 may be controlled by suitable means such as the damper 22 of customary construction, adjusted by the handle 23 on the outside of the duct.

A cold air supply duct 24 of suitable cross section, for example square, enters and communicates with the casing 17 at a suitable point preferably near the blower. The amount of air passing therethrough is similarly controlled by suitable means such as the damper 25 of customary construction, adjustable by the handle 26 on the outside of the duct.

The burner 27 is placed preferably centrally at and directed into the broader base 16 of the truncated combustion chamber so as to project the flame toward the narrow end 15 thereof. The baffle plate 28 is spaced from the open ends 11 and 18 of the hot air duct 10 and casing 17 respectively, in a position transverse to them so that the outer open end 16 of the combustion chamber 14 will fit preferably in registry over a corresponding opening 29 in the baffle plate.

The propeller 30 of the blower 13 is driven through customary intermediate means, such as the belt and pulley combination 31, its vanes 33 drawing hot air through the duct 10 and warmed insulating air through the casing 17 so that all streams of air will mix in the chamber 34 at the intake of the propeller, the mixture of air having the desired characteristics being forced out of the blower at its outlet 35 into suitable ducts to the processing operation or into the room or other space to be heated.

Any desired fuel may be led to the burner 27 through the combustion mixture line 36, primary air having first been introduced for mixture therewith through the mixing chamber 37.

In the operation of the embodiment of my invention illustrated in the drawing, secondary air to support combustion, drawn in through the opening 29 in the base plate 28, enters the combustion chamber 14 at its broader end 16 and supports combustion of the fuel issuing from the burner 27. The hot gases resulting from the combustion continue through the combustion chamber 14 in correspondingly increasing velocity because of its regularly decreasing cross-section and pass through the narrow end thereof into the duct 10. A second stream of air, drawn into the duct 10 through the opening between the outer open end 11 thereof and the base plate 28, flows past the outer surface of the walls of the combustion chamber 14, whereby it is heated to a relatively high temperature. In taking up heat therefrom, this stream of air keeps the temperature of the walls of the combustion chamber down, thereby preventing deterioration and burning out of the material of its construction. Because of the hereinabove described constant passage of a stream of cool air over the exterior surface of the combustion chamber, it is not necessary to employ about the combustion chamber or elsewhere in my unit heater any thick, heavy, bulky refractory lining material, such as fire brick, or other materials of ceramic and other composition, or other furnace linings.

Heat loss by radiation from the outer surface of the duct 10 is avoided by a third stream of air drawn through the annular space between said outer surface and the casing 17, which flowing stream of insulating air is raised in temperature by absorbing the heat passing, from the stream of hot gases carried in the duct 10, through the walls thereof. The stream of hot gases and warmed insulating air meet and mix in the chamber 34 at the intake of the blower 13. The mixture of air leaving the outlet 35 of the blower 13 is carried by suitable ducts of well known construction to any desired points in the processing operation.

The great difficulty, namely, the extinguishing of the flame by different streams of air entering the apparatus, frequently occurring with other fluid fuel burners, is eliminated by the particular design of my unit heater, as will be brought out hereinafter. Because of the truncated design of the combustion chamber and the location of the burner at the broader base of its truncated form, while the velocity of the hot gases leaving the narrow end of the combustion chamber may be high, the velocity of the gases entering about the burner is low enough not to interfere with the uninterrupted burning of the flame during the operation of the burner. The baffle plate 28, annularly surrounding the broader opening of the combustion chamber and in a plane substantially transverse to the axis thereof, serves to protect the burner flame from the streams of air entering the casing 17 and the duct 10 around the exterior surface of the combustion chamber. The possibility of unintentional extinguishing of the flame by a draft from any of streams of air entering the heater is thus avoided and the continual operation of the burner is assured.

The location of the flame end of the burner at the open broader base of the combustion chamber provides still another advantage in that it permits unhampered observation of the burner flame, which facilitates obtaining proper flame characteristics for any desired burning conditions during adjustment of the fuel and air mixture fed to the burner.

In certain operations where no harmful vapors or gases are taken up in the processing operation by the hot gases fed thereto from the unit heater, heat economy may be effected by leading the gases leaving the processing operation back through suitable ducts of well-known construction to the re-circulation duct 20, and the opening 21 to join the stream of fresh hot gases carried through the duct 10. The proportion of such re-circulated gases may be continually controlled by suitable adjustment of the damper 22, either by hand operation of the handle 23 or by suitable automatic regulating means. In such operation of the apparatus, the damper 25 may be adjusted so as to close the cool air duct 24. However, if desired, the damper 25 may be opened to permit the inflow of any desired amount of cool air to mix with the hot gases and warmed insulating air in the mixing chamber 34, depending on the desired operating conditions.

In certain operations in which large quantities of warm gases or air at a relatively low degree of heat are required, for example, in the drying of yarns leaving, dyeing, printing, finishing or related operations, a smaller sized heater can be employed for all the air to be furnished to the processing operation need not pass through the combustion chamber and the hot air duct. In such applications, the portion of air heated by passage through the hot air duct 10 is reduced in temperature by a stream of cool air drawn into the apparatus through the cool air duct 24, the amount of cool air entering easily being controlled by proper adjustment of the damper 25, either by hand operation of the handle 26 or by suitable automatic regulating means. Ordinarily in such operation the damper 22 may be adjusted so as to close the re-circulation duct 20. However, if desired or necessary, the damper 22 may be adjusted so as to permit the re-circulation of any desired portion of the warm gases or air leaving the processing operation.

The unit heater covered by my invention may be employed to supply hot gases or air in a wide variety of processing operations such as the drying of textiles, including fabrics leaving the dyeing and printing and similar operations or for drying other materials, core baking in foundries, normalizing of heat treated materials, baking operations employed in japanning, enamelling and lacquering, heating certain types of work rooms, and the like, and other operations requiring indirect application of heat through a gaseous medium.

While a particular design of my unit heater has been described hereinabove with particular reference to the specific embodiment thereof illustrated in the drawing, it is not intended to limit the invention to the transverse and longitudinal cross-sections of the combustion chamber, the hot gas and air duct, the casing, the recirculation duct, the cool air duct and the mixing chamber and the respective relative positions thereof hereinabove described and illustrated. These may be modified to other suitable shapes and positions governed by the peculiar space and economy problems and operating conditions of each specific installation. Thus, while the various air ducts and the casing have been illustrated as either square or rectangular, they may be circular, oval, elliptical or of any other suitable cross-section. While the hot air duct and the casing have been illustrated as L shaped in longitudinal cross-section, they may be straight or of any other suitable longitudinal cross-section. Similarly, any suitable design of blower, fan, impeller or other suitable means for propelling the gases through the apparatus may be employed and may be driven by any suitable means.

The hot air, re-circulation and cool air ducts and the casing may be constructed of any suitable material such as sheet steel or other suitable sheet material, governed by the operating conditions and constructional economy.

Any suitable type of fluid may be used to supply the heat to the apparatus described, for example, any combustible gas, kerosene, fuel oil, powdered coal, powdered coal dispersed in suitable oil, and the like, the choice of fuel being governed by the type of operation to which the heated gases are to be supplied, economy and other considerations. Any suitable burner, depending upon the type of fuel to be employed can be used.

While the combustion chamber has been described as of truncated conical or pyramidal design, it is intended to include therein any variations of a truncated form. If desired, the combustion chamber and the base or baffle plate may be made as one unit instead of two as hereinabove described. Also, instead of constructing the baffle plate as a flange running annularly about the broader end of and in a plane substantially transverse to the axis of the combustion chamber, it may be built as a flange set at any suitable angle to sufficiently protect the flame against drafts from the air or gas streams entering the duct 10 and casing 17. If desirable, the flange may be just a straight line extension of the walls of the combustion chamber outwardly for a sufficient distance beyond the base of the flame to sufficiently protect it against said drafts. The combustion chamber may be constructed of relatively thin sheet iron, steel, stainless steel, alloy, such as the Ascaloy or Alleghany metal alloys commercially known, or other alloys or other suitable heat conducting material. Such combustion chambers may be used without any refractory lining in my unit heater to furnish a supply of hot gases or air at a range of temperatures running from above ordinary room or atmospheric temperature to 1800° F., or even up to around 2200° F. Excellent results are obtained with units supplying gases at temperatures up to around 900° F. and even around 1000° F. When operating to deliver hot gases at these temperatures it is generally unnecessary to cover the outer surface of the casing 17 with any heat insulating material.

I claim:

1. A heater for delivering hot gases, comprising a duct having an air intake end open to the atmosphere, an open ended combustion chamber having walls of non-refractory material located in the open end of said duct and spaced from the sides thereof with its outer end projecting beyond said duct and a baffle projecting radially outward from said outer end to protect the flame from the draft of air entering said duct, a burner adapted to direct a flame into the open outer end of said combustion chamber for heating the walls thereof, a casing around and spaced from said duct to form an air passage therearound, a mixing chamber communicating with said duct and said casing and suction means associated with said mixing chamber adapted to draw air through said duct and over the walls of said combustion chamber for extracting heat therefrom, to draw air through said casing for extracting heat from the walls of said duct, and to draw combustion gases through the open inner end of said combustion chamber into said duct wherein the gases are mixed with the heated air.

2. A heater for delivering hot gases comprising a duct having an air intake and open to the atmosphere, an open-ended combustion chamber having walls of non-refractory material located in the open end of said duct and spaced from the sides thereof, the outer end of said combustion chamber projecting axially beyond said duct, and a baffle forming a continuation of the walls of said combustion chamber, said baffle being axially spaced from the end of the duct and having an external diameter greater than the open end of said duct whereby to protect the flame from the draft of air entering the duct, a burner in the outer end of said combustion chamber to direct a flame therein for heating the walls of the combustion chamber, a casing around and spaced from said duct to form an air passage there-around, a mixing chamber communicating with said duct and said casing and suction means associated with said mixing chamber to draw air through said duct and over the walls of said combustion chamber for extracting heat therefrom, to draw air through said casing for extracting heat from the walls of said duct, and to draw combustion gases through the open inner end of said combustion chamber into said duct whereby the gases are mixed with the heated air.

CHARLES L. GEHNRICH.